R. K. CARPENTER.
Bush-Hammers.

No. 158,199.　　　　　　　　　　Patented Dec. 29, 1874.

Witnesses.　　　　　　　　　　Inventor.

UNITED STATES PATENT OFFICE.

ROBERT K. CARPENTER, OF WEST MEDFORD, MASSACHUSETTS.

IMPROVEMENT IN BUSH-HAMMERS.

Specification forming part of Letters Patent No. 158,199, dated December 29, 1874; application filed November 13, 1874.

*To all whom it may concern:*

Be it known that I, ROBERT KING CARPENTER, of West Medford, in the county of Middlesex and State of Massachusetts, have invented an Improvement in Bush-Hammers; and I do hereby declare that the following, taken in connection with the drawings which accompany and form part of this specification, is a description of my invention sufficient to enable those skilled in the art to practice it.

In the construction of bush-hammers it is customary to clamp the different cutters together, and several methods have been adopted to keep them in line and place, such as placing wedges at the sides, top, and even between the cutters.

In my invention I take each cutter and slightly upset it on the top edge, in such a manner as to make it of a wedge shape. I then place the desired number of these cutters between the two plates which form the hammer-head, and made of such a shape that when they are bolted together they clamp the cutters as firmly as though they were all of one piece. To prevent the clamping-bolts from turning and loosening the cutters, I construct them with a projection under the head of each of the bolts, which fit into recesses in the hammer-head, thus holding them firmly in position. I also cut in the blunt ends of my cutters slots, in which the clamping-bolts fit, preventing any lateral movement of the cutters, and doing away with any extra pieces for that purpose.

The accompanying drawing represents a hammer embodying my invention.

Figure 1:
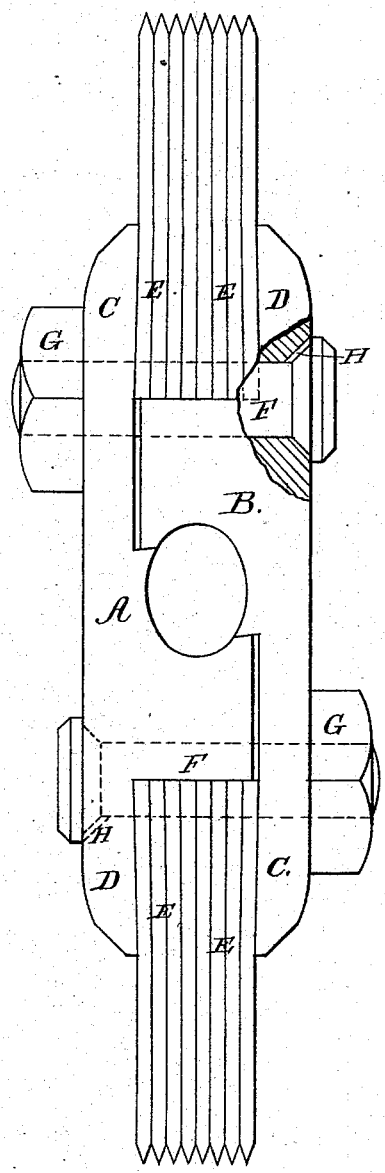
Figure 3:
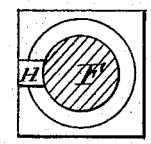
Figure 2:
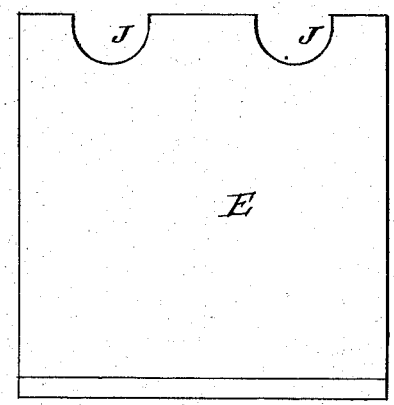

Figure 1 shows a plan of the hammer; Fig. 2, an elevation of one of the cutters; Fig. 3, a section of one of the bolts, showing the means for preventing its turning.

A B are the blocks of which the hammer-head is composed, and have extending therefrom lips C C and D D, which hold the cutters or cutter-plates E E. These blocks are fastened together by the bolts F F and nuts G G. To prevent the bolts from turning and loosening the cutters, I construct them as shown in Figs. 1 and 3, forming them inside the head of a cone shape, and extending therefrom projections H H, which fit into recesses in the head-blocks. The upper edges of the cutter-plates are upset, so as to make them slightly wedge-shaped, as shown in Fig. 1, to prevent their working out while in use, and are provided with slots J J, as shown in Fig. 2, to prevent their moving laterally, the whole being so arranged and constructed that when once put together, and the nuts screwed up tight, there is no possibility of the cutters working loose.

I claim—

1. A bush-hammer consisting of a series of cutters upset on their blunt ends, and firmly held together in the hammer-head, substantially as shown and described.

2. In combination with the head-blocks A B, with their inclined lips or projections C C D D, the upset cutters or cutter-plates E E, substantially as herein described.

3. In combination with the head-blocks A B and cutters E E, with their slots J J, the bolts F F, with their projections H H or their equivalents, and nuts G G, substantially as and for the purpose herein set forth.

R. K. CARPENTER.

Witnesses:
  C. WARREN BROWN,
  A. G. GEAR.